United States Patent [19]
Kinghorn

[11] Patent Number: 4,933,764
[45] Date of Patent: Jun. 12, 1990

[54] IMPROVED TELETEXT DECODER WHICH ACCOMMODATES AN INCREASED NUMBER OF CHARACTER CODES

[75] Inventor: John R. Kinghorn, Ashtead, England

[73] Assignee: U.S. Philips Corporation, New York, N.Y.

[21] Appl. No.: 219,517

[22] Filed: Jul. 15, 1988

[30] Foreign Application Priority Data

Jul. 17, 1987 [GB] United Kingdom ................. 8716868

[51] Int. Cl.[5] ................................................ H04N 7/08
[52] U.S. Cl. ...................................... 358/142; 358/147
[58] Field of Search ............... 358/147, 146, 142, 188; 340/750, 748

[56] References Cited

U.S. PATENT DOCUMENTS 4,161,728 7/1979 Insam ................................ 358/147
4,712,188 12/1987 Nishiyama ......................... 340/750

FOREIGN PATENT DOCUMENTS 2821886 4/1979 Fed. Rep. of Germany ...... 358/147
2149627 6/1985 United Kingdom .

OTHER PUBLICATIONS

BBC et al., *Broadcast Teletext Specification* (Sep. 1976).
IBM, "IBM Display Write/36 Tips and Techniques: Document No. G360-1002-01", pp. 25-29.
Veith, Richard H., "Televisions Teletext" 1983, Elsevier Science Publishing Co., pp. 157-161.

*Primary Examiner*—James J. Groody
*Assistant Examiner*—David E. Harvey
*Attorney, Agent, or Firm*—William Squire

[57] ABSTRACT

A teletext decoder has a character memory comprising a common language set of characters and a plurality of sub-sets of national option characters, each of which latter sets makes up a complete national language set when combined with the common language set. The totality of characters are addressable using n bit digital codes together with an additional bit which determines one of two addressing modes. In one addressing mode, only one of the national option sub-sets can be selected by addressing means so that a page can be displayed using one complete language set. In the other addressing mode, all the national option sub-sets can be selected by processor means to enable a page to be displayed using more than one language set.

10 Claims, 4 Drawing Sheets

Fig.4a.

| | | | | CC | 0 | 1 | 2 | 3 | 4 | 5 | 6 |
|---|---|---|---|---|---|---|---|---|---|---|---|
| | | | | b8 | 0 | 0 | 0 | 0 | 0 | 0 | 0 |
| | | | | b7 | 0 | 0 | 0 | 0 | 1 | 1 | 1 |
| | | | | b6 | 0 | 0 | 1 | 1 | 0 | 0 | 1 |
| RR | b4 | b3 | b2 | b1 / b5 | 0 | 1 | 0 | 1 | 0 | 1 | 0 |
| 0 | 0 | 0 | 0 | 0 | α BLACK | γ BLACK | (SPACE) | 0 | § | P | ° |
| 1 | 0 | 0 | 0 | 1 | α RED | γ RED | ! | 1 | A | Q | a |
| 2 | 0 | 0 | 1 | 0 | α GREEN | γ GREEN | " | 2 | B | R | b |
| 3 | 0 | 0 | 1 | 1 | α YELLOW | γ YELLOW | # | 3 | C | S | c |
| 4 | 0 | 1 | 0 | 0 | α BLUE | γ BLUE | $ | 4 | D | T | d |
| 5 | 0 | 1 | 0 | 1 | α MAGENTA | γ MAGENTA | % | 5 | E | U | e |
| 6 | 0 | 1 | 1 | 0 | α CYAN | γ CYAN | & | 6 | F | V | f |
| 7 | 0 | 1 | 1 | 1 | α WHITE | γ WHITE | ' | 7 | G | W | g |
| 8 | 1 | 0 | 0 | 0 | FLASH | CONCEAL | ( | 8 | H | X | h |
| 9 | 1 | 0 | 0 | 1 | STEADY | CONTIG γ | ) | 9 | I | Y | i |
| 10 | 1 | 0 | 1 | 0 | END BOX | SEP γ | * | : | J | Z | j |
| 11 | 1 | 0 | 1 | 1 | START BOX | NO ACTION | + | ; | K | Ä | k |
| 12 | 1 | 1 | 0 | 0 | NORMAL HEIGHT | BLACK BK GND | , | < | L | Ö | l |
| 13 | 1 | 1 | 0 | 1 | DOUBLE HEIGHT | NEW BK GND | - | = | M | Ü | m |
| 14 | 1 | 1 | 1 | 0 | NO ACTION | HOLD γ | . | > | N | ^ | n |
| 15 | 1 | 1 | 1 | 1 | NO ACTION | RELEASE γ | / | ? | O | — | o |

32

Cont

Fig. 4b.

| 7 | 8 | 9 | 10 | 11 | 12 | 13 | 14 | 15 |
|---|---|---|---|---|---|---|---|---|
| 0 | 1 | 1 | 1 | 1 | 1 | 1 | 1 | 1 |
| 1 | 0 | 0 | 0 | 0 | 1 | 1 | 1 | 1 |
| 1 | 0 | 0 | 1 | 1 | 0 | 0 | 1 | 1 |
| 1 | 0 | 1 | 0 | 1 | 0 | 1 | 0 | 1 |
| p | @ | É | (SPACE) | 0 | é | à | i | Á |
| q | — | é | ! | 1 | ù | è | ¿ | À |
| r | ¼ | ä | " | 2 | à | â | ü | È |
| s | £ | # | # | 3 | £ | é | ç | Í |
| t | $ | ¤ | $ | 4 | $ | ï | $ | Ï |
| u | | | % | 5 | ã | Ã | a̲ | Ó |
| v | | | & | 6 | õ | Õ | o̲ | Ò |
| w | ? | | ' | 7 | • | Ç | Ñ | Ú |
| x | ‖ | ö | ( | 8 | ò | ô | ñ | æ |
| y | ¾ | å | ) | 9 | è | û | é | Æ |
| z | ÷ | ü | * | : | ì | ç | à | ô |
| ä | ← | Ä | + | ; | ° | ë | á | Đ |
| ö | ½ | Ö | , | < | ç | ê | é | ø |
| ü | → | Å | _ | = | → | ù | í | Ø |
| β | ↑ | Ü | . | > | ↑ | î | ó | b |
| ■ | # | — | / | ? | # | # | ú | p |

224 DISP

IMPROVED TELETEXT DECODER WHICH ACCOMMODATES AN INCREASED NUMBER OF CHARACTER CODES

BACKGROUND OF THE INVENTION

1. Field of the Invention

This invention relates to teletext decoders for receiving, storing and processing teletext information which is transmitted as digitally coded data.

2. Related Art

A teletext decoder which is suitable for producing character display data for a teletext display page includes an acquisition circuit for acquiring digital codes representing teletext display information for the page, a page memory for storing these acquired digital codes, and a character generator for producing character display data in accordance with the stored digital codes.

Conventionally, the character generator includes a character memory in which is stored character information representing the character shapes which are available for display. The character memory is selectively addressed using the digital codes stored in the page memory to read out the character display data. The character information for each character shape is stored in at least one individual character memory location which is addressable by a respective digital code. Normally, only a portion of the character information for a character shape is read out at any one time as the character display data, which portion is displayed in a current scanning line of the display.

Current transmissions of teletext information are in broadcast television signals. These teletext transmissions in the United Kingdom are essentially only in the English language, and a character generator which is used for these transmissions includes a character memory containing the character information for an English language character set. Where teletext transmissions are provided in a country whose national language uses a different character set, a character generator which is used for these latter transmissions can include a character memory containing the character information for a character set for the language concerned.

The character requirements of the major European languages differ only in a few (~11) national use character options. Therefore, these requirements can be met by a single composite character memory containing the character information for a common character set and a plurality of national option character sub-sets each of which sub-sets forms with the common character set a complete language character set for a respective language.

In current teletext transmissions, control information which forms part of the teletext information for a page identifies which language character set should be used to display the page. Where a teletext decoder has a character generator with a character memory containing, as aforesaid, a common character set and a plurality of national option character sub-sets, this control information is used in the teletext decoder to select a particular sub-set from those which are available and thereby in effect select a single language character set.

As is known from Applicants GB patent specification No. 2 149 627, a small group of the total number of the possible digital codes representing the teletext information may be allocated in common for identifying different character shapes in several national option character sub-sets, the character information for each of which is stored in a respective block of character memory locations. The control information is used to determine which block is to be addressed in respect of acquired digital codes belonging to this small group. If these acquired digital codes as stored in the page memory are not codes which can themselves address memory locations in the selected block, then code conversion is carried out when these digital codes are read out from the page memory to convert them into the appropriate codes for this addressing. To achieve this, each of the digital codes in the small group has to be identified separately so as to be code converted, or not, in accordance with the control information.

The selection of a particular one of several national option character sub-sets by means of the control information has the limitation that it is not possible to mix languages on a single page. Another more serious limitation occurs in connection with a facility proposed for teletext decoders which are micro-processor controlled, whereby locally-generated status messages can be displayed under the control of the microprocessor on an additional display row either alone or with a displayed page which contains received broadcast display rows. Such a status message should be in a given language which should not change even though the language of received broadcast pages may vary. Thus, this status message facility can require a mixed language page display which cannot be achieved using said control information.

In order to overcome these limitations, Applicants GB patent specification No. 2149627 mentioned previously discloses a teletext decoder having a character memory in which is stored character information in the form of a common character set and a plurality of national option character sub-sets. This teletext decoder functions according to a first addressing mode in which any one of said sub-sets can be chosen by control information contained in received teletext information to form with the common character set a complete language character set from which characters can be selected to provide for page display in only one language, and a second addressing mode in which all of the sub-sets can be chosen to form with the common character set a corresponding plurality of complete language character sets from all of which characters can be selected to provide for page display in more than one language.

In a specific implementation of this teletext decoder, the addressing of characters in both addressing modes is effected using different 7-bit codes. A major portion of the total possible number of the 7-bit codes are used in both modes to select respective characters in the common language character set. In the second mode most of the remaining 7-bit codes are used to select respective characters in all of the national option character sub-sets However, in the first mode only a few of these remaining 7-bit codes, sufficient for selecting the characters of only one national option sub-set, are available for character selection because the others are required instead for control purposes. As a consequence, the control information contained in received teletext information is used to choose by means of code conversion (or not) which single national option sub-set can have its characters selected in respect of said few remaining 7-bit codes. An eighth bit is associated with each 7-bit code. When this eighth bit is set to logic 0, the first addressing mode obtains, and when it is set to logic 1, the second addressing mode obtains. This eighth bit is therefore used merely as a "toggle" to determine whether most or only a few of said remaining 7-bit codes are to be used for selecting the characters of the national option sub-sets. The number of characters that can be provided in each national option sub-set is limited by the number of 7-bit codes that remain for selecting these characters after the allocation of respective 7-bit codes for selecting the characters of the common language set.

The implementation of the teletext decoder described in Applicants aforementioned GB patent specification No. 2149627 for processing the 7-bit codes which represent different characters is based on the premise that $2^7=128$ different codes are available for character selection, this being the number of possible different 7-bit codes that can be received by the teletext decoder from a transmission source. In conformity with this premise, and allotting 32 of these codes for selecting control characters, the character memory has 96 memory locations, containing different character shapes, which can be addressed by a respective one of the 96 remaining codes. In the embodiment described, the character memory also has a further 32 memory locations containing further character shapes, mainly for national option characters. In order to address these further memory locations, the eighth bit associated with each of the thirty-two 7-bit codes concerned is set to logic 1, as aforesaid, in order to distinguish from when these 7-bit codes are used to select control characters. However, there is no need to distinguish, the 96 remaining 7-bit codes in any way because they are always used to address the same memory locations. Therefore, in respect of these remaining 7-bit codes, the eighth bit is a "don't care" bit in the sense that the same 96 memory locations will be addressed regardless of whether this bit is a logic 0 or a logic 1.

SUMMARY OF THE INVENTION

It is an object of the present invention to provide a teletext decoder having a character generator in which a larger number of character memory locations can be addressed by individual codes.

According to the invention a teletext decoder which is suitable for producing character display data for a teletext display page includes an acquisition circuit for acquiring n-bit digital codes representing teletext display information for the page, a page memory for storing these acquired digital codes and a character generator comprising addressing means and a character memory for producing under the control of processor means character display data in accordance with the stored digital codes, which teletext decoder is characterised in that said character memory has a number of memory locations greater than $2^n$ but less than $2^{n+1}$) which contain character information representing respective different character shapes and are addressable by (n+1)-bit digital codes applied to the character memory by the addressing means, and in that said (n+1)-bit digital codes are produced in accordance with two addressing modes in one of which said processor means determines the logic value (1 or 0) of the additional bit and in the other of which said addressing means determines the logic value (1 or 0) of the additional bit.

By using (n+1) bit digital codes in accordance with the invention for addressing the character memory, many more separately addressable character shapes are available than was hitherto possible compared with the use of the additional bit merely as a "toggle", accompanied by duplication of a major portion of the character shapes in the character memory.

BRIEF DESCRIPTION OF THE DRAWING

In order that the invention may be more fully understood reference will now be made by way of example to the accompanying drawings, of which:

FIG. 4 is a table illustrating the character memory addressing in a character generator of a teletext decoder according to the invention.

DETAILED DESCRIPTION OF THE PREFERRED EMBODIMENT

Figure 1:
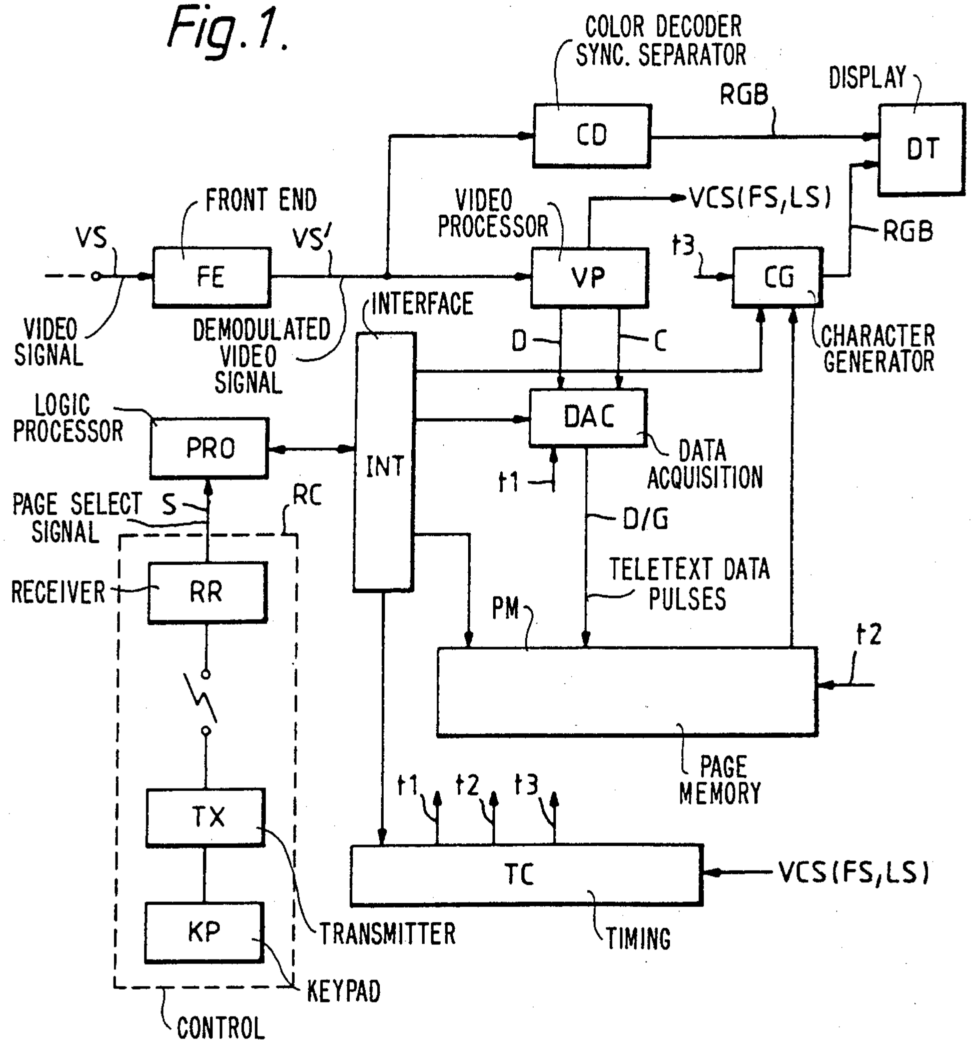
FIG. 1 is a block diagram of a teletext television receiver including a teletext decoder according to the invention.

Referring to the drawings, the teletext television receiver shown in FIG. 1 comprises video and data processing circuits for receiving and displaying both normal picture information and teletext information. The front end FE of the receiver comprises conventional amplifying, tuning and intermediate frequency detector circuits, and is connected to receive an incoming television video signal VS. For normal picture display by the television receiver, the demodulated video signal VS' is applied to a colour decoder which produces the RGB component signals for the picture display. Time base circuits for a display device DT (e.g. a CRT) receive the usual line and field synchronising pulses from a sync. separator circuit which extracts these synchronising pulses from the video signal VS'. The element CD represents the colour decoder and these other circuits which are provided for normal picture display.

The demodulated video signal VS' is also applied to a teletext decoder section of the television receiver that deals with the receipt and display of alpha-numeric text and other teletext information which is received as digitally coded data. This section comprises a video processor circuit VP which performs data slicing for retrieving teletext data pulses D from the video signal VS'. The video processor VP also produces input data clock pulses C from the data pulses D. The data pulses D are fed together with the clock pulses C to a data acquisition circuit DAC which is operable to feed selected groups D/G of the teletext data pulses to a page memory PM as digital codes representing address, display and control information. The page memory PM has a capacity for storing the display and control information for at least one teletext display page.

A logic processor PRO is operable in accordance with page select signals S applied to it from a remote control arrangement RC to control which groups of teletext data pulses D/G are acquired by the data acquisition circuit DAC. The arrangement RC has a receiver part RR and a remote transmitter part comprising a transmitter TX and a keypad KP. The processor PRO is further operable to read out from the page memory PM the stored digital codes for application to a character generator CG which is responsive to the applied digital codes to produce RGB component signals for displaying the selected page. A timing circuit TC provides timing signals on connections t1 to t3 for the circuit elements DAC, PM and CG. These circuit elements and the timing circuit TC are accessed by the processor PRO via an interface circuit INT. The operation of the timing circuit TC is synchronised with the received video signal VS by a composite pulse signal VCS which contains the line (LS) and field (FS) synchronising pulses as separated from the demodulated video signal VS' in the video processor VP.

In the teletext television receiver shown in FIG. 1, only single line connections have been shown for the interconnections between the various circuit elements for the sake of simplicity. However, it will be apparent to a person skilled in the art that in practice many of these interconnections would be multi-line. For instance, whereas the teletext data pulses D retrieved from the video signal VS' are applied serially to the data acquisition circuit DAC over a single line connection, serial-to-parallel conversion takes place within this circuit DAC, so that the groups D/G of teletext data pulses are applied to the memory PM in parallel over a multi-line connection.

Although a composite television receiver for receiving both normal picture information and teletext information is exemplified in FIG. 1, it will be appreciated that the teletext decoder section for data acquisition together with the front end FE may be provided as a separate teletext decoder which is adapted to feed either a display monitor or a conventional television receiver. Also, the teletext information stored in the page memory may be utilised for purposes other than display, depending on its content. For instance, the teletext information can be read from the page memory under the control of the processor for onward transmission over an external data link (not shown) to a computer or other data terminal.

Figure 2:
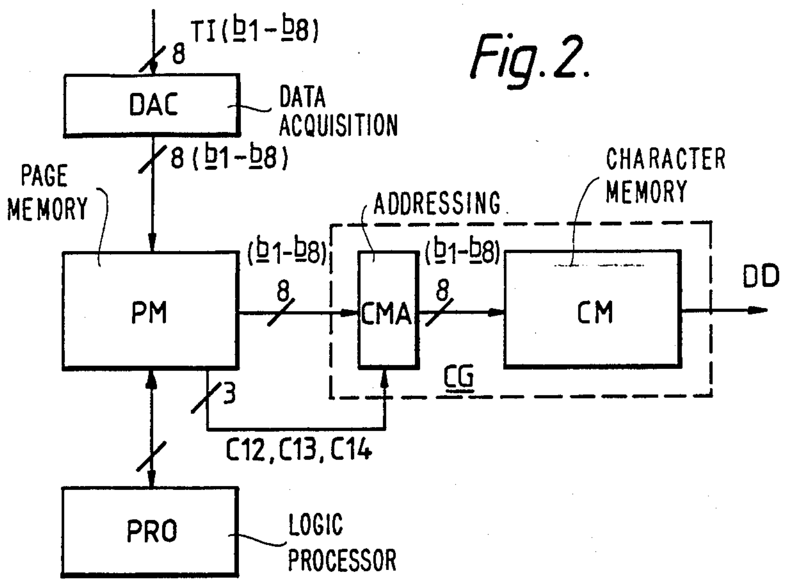
FIG. 2 is a simplified block diagram of the teletext decoder.

The simplified block diagram in FIG. 2 of the teletext decoder shows the data acquisition circuit DAC, the page memo y PM, the processor PRO, and the character generator CG which includes a character memory CM and an associated addressing circuit CMA.

For the present purposes, it will be assumed that the teletext information to be processed by the teletext decoder conforms to the specification laid down in the document "Broadcast Teletext Specification", September 1976, published jointly by the British Broadcasting Corporation, Independent Broadcasting Authority and British Radio Equipment Manufacturers' Association. In this document, a quantity of teletext information to be considered as an entity is termed a page, as already mentioned. All of the pages which are available are normally transmitted in a recurrent cycle, with or without up-dating page information, as appropriate. The teletext decoder is operable to select any page and the digital codes representing the page information are acquired by the teletext decoder from the cyclic transmission and stored in the page memory for as long as the page is required. Each page consists of up to 24 display rows each having 40 character positions. The first display row (Row 0) of each page is termed a page-header and contains inter-alia the page number.

The data acquisition circuit DAC receives teletext information TI representing display and control characters in the form of 8-bit codes b1 to b8 of which the seven bits b1 to b7 of each code represent a digitally coded character and the eighth bit b8 is a parity bit. The parity bit is used to test for odd-parity and is stripped off each received code which, if its parity checks out, is stored in the page memory PM with its eighth bit b8 initially re-instated as the most significant bit but always as a logic 0. Under the control of the processor PRO, the 8-bit codes b1 to b8 are read out from the page memory PM and applied to the addressing circuit CMA which uses these applied codes to address the character memory CM to produce character display data DD. A digital code actually used to address the character memory CM may be different from the corresponding digital code read out from the page memory PM, this latter code having undergone code conversion in accordance with three control bits (C12, C13, C14) transmitted in a page header of an acquired page and stored in the page memory PM. These three control bits select one of a number of different language character sets which is to be used for displaying the acquired page.

The actual character information which is stored in the character memory CM represents the available character shapes for display. The character shapes, together with so-called control characters which control various display functions are organised as shown in the memory map table of FIG. 4.

This table comprises 256 character positions arranged in matrix form in 16 rows RR and 16 columns CC. These character positions, or more precisely their contents, are identified by respective digital codes comprising eight bits b1 to b8.

The 32 character positions in the first two columns 0 and 1 contain respective control characters Cont which are assumed to correspond to those given in the document "Broadcast Teletext Specification". These control characters control the display facilities and are not, of course, actually stored in the character memory CM. The remaining colums 2 to 15 contain respective display characters Disp. More particularly, the 96 character positions in the six columns 2 to 7 contain respective character shapes comprising a common language set of 83 characters and a German national option character sub-set of 13 characters. These latter 13 characters are at the character positions identified by a black triangular top right hand corner. Columns 8 and 9 (except for their rows 5,6 and 7) contain, respectively, an English and a Swedish national option character sub-set of 13 characters each. Columns 10 and 11 are repeats of columns 2 and 3, respectively. Columns 12, 13 and 14 (except for their rows 5,6 and 7) contain, respectively, an Italian, a French and a Spanish national option character set of 13 characters each. The three excepted character positions in the rows 5, 6 and 7 of columns 8,9,12,13 and 14 contain supplementary characters, as also do all the 16 character positions in column 15.

Figure 3:
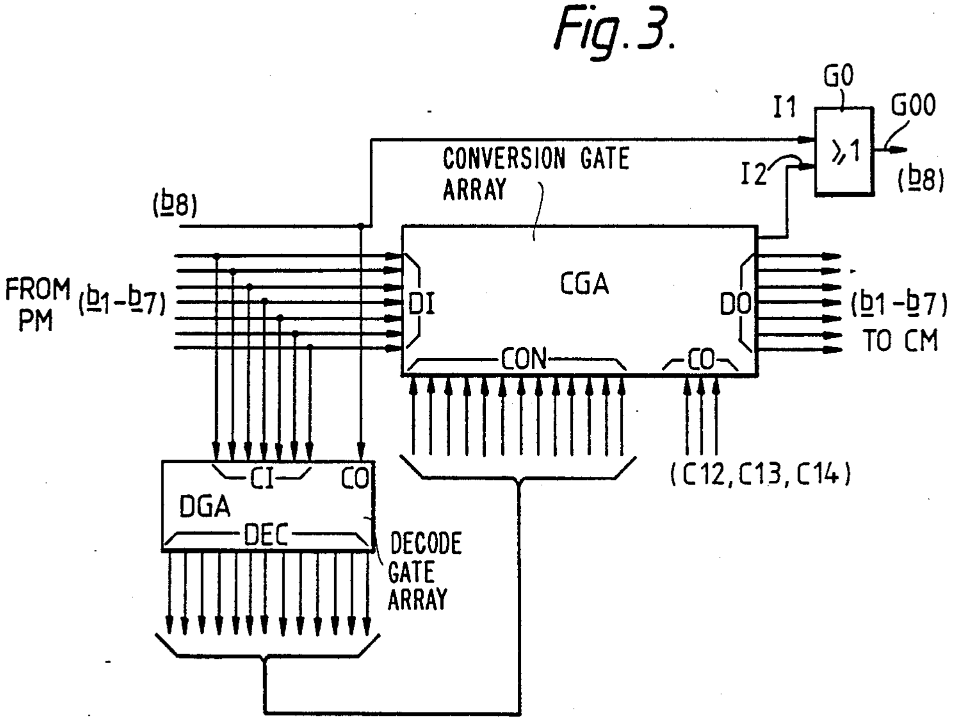
FIG. 3 is a block diagram showing elements of the teletext decoder for implementing the invention.

The elements of the teletext decoder shown in FIG. 3 form an addressing circuit which produces the requisite 8-bit codes for the selective addressing of the character memory CM as set forth in the table of FIG. 4 and in accordance with either of two addressing modes. This addressing circuit comprises a conversion gate array CGA to respective data inputs DI of which are applied the first seven bits b1 to b7 of the 8-bit codes read out from the page memory PM. The eighth bit b8 is applied as a control signal to a control input CO of a decode gate array DGA and also to one input I1 of an OR-gate GO. A second input I2 to the OR-gate GO is connected to the (b8) data output DO of the array CGA. The bits b1 to b7 of the codes read out from the page memory PM are also applied to respective code inputs CI of the character gate array DGA. There are 13 "decode" outputs DEC from the decode gate array DGA which are applied to respective "convert" inputs CON of the conversion gate array CGA. The control bits C12, C13 and C14, when received in a page header of an acquired page are applied to respective "control" inputs CO of the array CGA. In a first addressing mode, in which the eighth bit b8 of codes read out from the page memory PM is set to logic value 0, the OR gate GO maintains this logic value of the bit b8 from the array CGA at its output GOO.

With reference to the table in FIG. 4, after the 32 codes which identify control characters have been allocated as set forth in columns 1 and 2, the remaining 96 different codes of the seven bits b1 to b7 are allocated to address respective character positions in the columns 2 to 7 as indicated. Therefore in this instance, there is only ordinary or direct addressing of the character memory CM without any code conversion. As previously mentioned, the 96 character shapes in the columns 2 to 7 comprise a complete German language set.

Consider now code conversion, the 3-bit codes of the control bits C12, C13 and C14 can determine any one of eight different national language options of which six are used in the present embodiment. When this 3-bit code is 001, then it may be assumed that no code conversion takes place and there is only ordinary or direct addressing as described above in respect of the complete German language set. When a different 3-bit code is received, conversion to a different national option set can be effected. This conversion is only in respect of the codes which normally address the thirteen characters of the German national option set in columns 2 to 7. When any one of these codes is received, a signal is produced on the relevant one of the 13 "decode" outputs DEC of the decode gate array DGA. This signal at the relevant "convert" input CON of the array CGA, in conjunction with the signals representing the 3-bit code of the control bits C12, C13, C14 at the control inputs CO, cause the array CGA to convert the received 7-bit code into an 8-bit code which is produced at its data outputs DO for addressing the relevant character position of one of the other national option sets in columns 8,9,12,13, or 14. It is to be noted that for a character position in any of these columns the eighth bit b8 of the relevant code has a logic value 1. This is achieved in the addressing circuit by the array CGA always supplying a bit b8 of logic value 1 to the second input I2 of the OR-gate GO so that the gate output GOO carries the bit b8 of logic value 1.

In a second addressing mode, the eighth bit b8 in the relevant code combinations stored in the page memory PM is set to logic value 1 value by the processor PRO. Therefore, the decode gate array DGA is disabled in respect of these codes so that their 7-bit codes as applied to the array CGA do not undergo any code conversion. The 7-bit output codes b1 to b7 from the array CGA are therefore the same as the applied 7-bit input codes, with the addition of the bit b8 of logic value 1 as produced on the gate output GOO by the gate GO in response to the bit b8 of logic value 1 applied to its first input I1. This means that by using a combination of the first and second addressing modes any individual character position in the entire table of FIG. 4 can be selectively addressed without any code conversion being necessary. The character positions in columns 2 and 3 are repeated in columns 10 and 11, and each pair of corresponding positions in columns 2 and 10 and columns 3 and 11, respectively are addressed by 8-bit codes which are the same except for the logic value of bit b8. The effect of this is that the eighth bit b8 is a "don't care" bit and can have either a logic value 0 or a logic value 1. This is a convenient addressing facility in certain circumstances but at the expense of the number of different character shapes whose character positions can be addressed uniquely.

The display of a page of text is not restricted to the use of only one national option set as determined by the control bits C12, C13, C14 in the page-header of the page, so that under the control of the processor PRO, characters from any of the national option sets can be selected for the display. Therefore, a message generated locally by the processor PRO for an additional status row in a displayed page can be in a given language using the appropriate national option character set irrespective of what language—and thus national option character set—is used for the acquired page. Also, an acquired page can be displayed using more than one national option character set as determined by extension data packets.

An extension data packet is received and stored in the page memory along with the basic display information for the page concerned. The extension packet comprises a number of groups of information, one for each character to be changed. Each group contains three items of data. The first item identifies a character position in the page, the second item is a description of the change to be effected, and the third item identifies the character to which the change is to be applied. For example, say the code 10000010 for the character shape A is stored in the page memory. A teletext decoder without processor conversion facilities will usefully display this character shape A. However, the display character shape should ideally be Å, and information to this effect is contained in a received extension packet associated with the display page. The processor accesses this information of which the first item identifies the character position which is the address of the memory location in the page memory at which the code 1000010 for the character shape is stored. The second item of information identifies the symbol o, and the third item of information identifies the character shape Å to which this symbol is to be applied. In response to this information, the processor writes the code 10111001 for the character shape Å into the page memory at the identified character position. Thus, when the page information is now read out the character memory location which contains the character information for the character shape Å will be addressed directly by the code 10111001.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived thereform.

I claim:

1. A teletext decoder for producing character display data for a teletext display page, the decoder comprising:

(a) an acquisition circuit for acquiring n-bit digital codes representing teletext display information for the page, (b) a page memory for storing the n-bit digital codes and for providing the n-bit digital codes to other parts of the decoder, (c) a character generator comprising:

(i) addressing means for supplying (n+1)-bit digital codes in response to the provided n-bit digital codes and an additional bit, the addressing means assuming first and second addressing modes in response to the additional bit, and (ii) a character memory for controllably producing character display data in accordance with the supplied (n+1)-bit digital codes said character memory having a number of memory locations greater than $2^n$ but less than $2^{(n+1)}$ which contain character information representing respective different character shapes which said memory locations being addressed by the supplied (n+1)-bit digital codes applied to the character memory by the addressing means, and (d) processor means for controlling the value of the additional bit which causes the addressing means to assume said first and second modes so that in said second mode the processor means generates the (n+1)th bit of the supplied (n+1)-bit digital codes and so that in said first mode the addressing means generates the (n+1)th bit.

2. A teletext decoder as claimed in claim 1, wherein (a) the character information stored in the character memory comprises a common language set of characters and a plurality of sub-sets of national option characters, any one of which is selectable by the addressing means in said first mode to form with the common language set a respective single complete language set, (b) said addressing means comprises:

(i) code conversion means responsive to control signals, during said first mode, to cause selection of one of the national option sub-sets;

(ii) decoding means enabled by the additional bit during said first mode, said decoding means being connected to receive the provided n-bit digital codes, and for selectively producing decode signals to identify to the code conversion means those provided n-bit digital codes for which code conversion is to be effected in the code conversion means; and (iii) output means for supplying the (n+1)th bit of the supplied (n+1)-bit digital codes.

3. A teletext decoder as claimed in claim 2, wherein:

(a) in said second mode, all of said national option sub-sets can be selected by said addressing means to form with the common language set a plurality of complete language sets, and (b) the processor means controlling said addressing means in the second mode to form the supplied (n+1) bit codes which are for addressing said character memory, by using without conversion all of the provided n-bit codes received by the addressing means in conjunction with the additional bit value which is supplied to the output means.

4. A television receive embodying a teletext decoder as claimed in claim 1.

5. A teletext decoder as claimed in claim 1 wherein portions of the character information is stored in pairs of memory locations within the character memory, each pair of memory locations including first and second memory locations which are addressable using respective first and second (n+1)-bit codes, the first and second codes differing only in a value of the (n+1)th bit.

6. The receiver of claim 4 wherein (a) the character information stored in the character memory comprises a common language set of characters and a plurality of sub-sets of national option characters, any one of which is by the addressing means in the first mode selectable to form with the common language set of a respective single complete language set, and (b) said addressing means comprises:

(i) code conversion means for supplying control signals to the addressing means, during said first mode, so that said addressing means selects one of the national option sub-sets under control of the control signals;

(ii) decoding means enabled by the additional bit during said first mode, said decoding means being connected to receive the provided n-bit digital codes received by the addressing means, and selectively producing decode signals to identify to the addressing means those n-bit digital codes for which code conversion is to be effected in the code conversion means; and (iii) output means for supplying the (n+1)th bit of the supplied (n+1)-bit codes.

7. The receiver of claim 4 wherein, (a) in said second mode, all of said national option sub-sets can be selected by said addressing means to form with the common language set a plurality of complete language sets, and (b) the processor means controls the addressing means in the second mode to form the supplied (n+1) bit codes which are for addressing said character memory, by using without conversion all of the n-bit codes received by the addressing means in conjunction with a bit value supplied by the output means.

8. The receiver of claim 4 wherein portions of the character information is stored in pairs of memory locations within the character memory, each pair of memory locations including first and second memory locations which are addressable using respective first and second (n+1)-bit codes, the first and second codes differing only in a value of the (n+1)th bit.

9. The decoder of claim 1 wherein n=7.

10. A teletext decoder for producing character display data for a teletext display page, the decoder comprising:

(a) means for receiving and storing n-bit digital codes;

(b) means for generating characters from the n-bit digital codes comprising:

(i) memory means for storing character display data and for supplying the character display data in response to (n+1)-bit digital codes, said memory means having a number of memory locations greater than $2^n$ and less than $2^{(n+1)}$, said memory means storing a common language set of characters and a plurality of sub-sets of national option characters, any one of the sub-sets being selectable in a first addressing mode to form with the common language set a respective single complete language set, all of the sub-sets being simultaneously selectable in a second addressing mode to form a multinational character set which is complete for a plurality of languages; and (ii) means for generating the (n+1)-bit digital codes from the n-bit digital codes, an additional mode selecting bit, and control signals said generating means providing said first mode for accessing a particular one of the sub-sets and providing said second mode for addressing all of the sub-sets and comprising:

(A) decoding means:

(I) in said first mode, for producing producing an identification signal which identifies within the character memory of character shapes which correspond to the sub-sets; and (II) in said second mode, being disabled; and (B) code conversion means for producing (n+1)-bit digital codes, said code conversion means:

(I) in said first mode, responsive to the identification signal and controlled by the control signals which signal the one of the sub-sets, for converting said n-bit digital codes into the produced (n+1)-bit digital codes, when the identification signal is produced but supplying a data bit and, without conversion, said n-bit digital codes when said identification signal is not provided; and (II) in said second mode, supplying said n-bit signals without conversion and the data bit; and (C) means for supplying the (n+1)th bit of the generated (n+1)-bit digital codes, said supplying means being responsive to said the mode selecting bit and the data bit; and (D) processor means for (I) in said first mode, supplying to the code conversion means the control signals signalling the one of the respective single language sub-sets; and (II) in said second mode, determining the (n+1)th bit supplied by the supplying means.

* * * * *